(12) United States Patent
Vermilyea et al.

(10) Patent No.: US 6,421,725 B1
(45) Date of Patent: Jul. 16, 2002

(54) METHOD AND APPARATUS FOR PROVIDING AUTOMATIC NOTIFICATION

(75) Inventors: David G. Vermilyea, Cary; Mark J. Adamson, Raleigh; Jamie E. Kirby, Cary; Manoj K. Jha, Raleigh, all of NC (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/564,878

(22) Filed: May 4, 2000

(51) Int. Cl.[7] .............................................. G06F 15/173
(52) U.S. Cl. ........................ 709/224; 709/223; 709/226; 709/206; 709/207; 709/227; 379/9; 379/14; 379/32; 379/134; 379/242; 371/32; 371/33; 714/755; 714/788
(58) Field of Search ................................. 709/224, 206, 709/207, 223, 227, 226; 379/32, 14, 134, 9, 242; 371/33, 32; 714/755, 788

(56) References Cited

U.S. PATENT DOCUMENTS

| | | | | |
|---|---|---|---|---|
| 5,329,520 A | * | 7/1994 | Richardson | 370/16 |
| 5,699,367 A | * | 12/1997 | Haartsen | 371/33 |
| 5,734,697 A | * | 3/1998 | Jabbarnezhad | 279/32 |
| 5,901,208 A | * | 5/1999 | Jabbarnezhad | 379/134 |
| 5,930,333 A | * | 7/1999 | Jabbarnezhad | 379/14 |
| 5,983,384 A | * | 11/1999 | Ross | 714/755 |
| 6,094,681 A | * | 7/2000 | Shaffer et al. | 709/224 |

* cited by examiner

*Primary Examiner*—David Wiley
*Assistant Examiner*—Oanh L. Duong (57) ABSTRACT

A system receives information from users relating to activities that may impact a network. The system then automatically generates a ticket to track the activity. The system also automatically selects a recipient(s) for a notification message relating to the activity and transmits the notification message to the intended recipient(s).

25 Claims, 5 Drawing Sheets

METHOD AND APPARATUS FOR PROVIDING AUTOMATIC NOTIFICATION

FIELD OF THE INVENTION

The present invention relates to providing notification of activities and, more particularly, to a method and apparatus for providing automatic notification of activities that may affect a telecommunications network.

BACKGROUND OF THE INVENTION

Large telecommunications networks typically include thousands of miles of cables that carry data and voice traffic. In urban areas, these cables are often located underground, while in rural areas, these cables are typically routed above ground. In either case, construction activities frequently take place near the network cables.

A company operating a network may monitor the construction sites to ensure that these activities do not adversely affect the network. For example, a field engineer responsible for a particular area where a construction dig is to occur may have to go to the construction site to make sure that the digging does not result in the inadvertent cutting of any network cables.

For a company operating a large telecommunications network over a wide area, there may be thousands of separate construction activities each day that require monitoring to ensure that the activity does not adversely affect the network. In such a situation, it becomes difficult for the company to adequately track all the construction activity.

Another problem associated with monitoring construction activity is that the company running the network is often unaware of the construction until shortly before the dig is to take place. For example, the company may not be notified of a dig until as little as a few hours before the dig is to occur. In such a situation, the logistics involved in receiving the construction-related information, logging the information and notifying the appropriate field personnel often requires more time than is available before the dig is to commence. In such situations, the company operating the network is often forced to merely hope that the dig will not impact their network cables, before they are able to send the appropriate field personnel to monitor the construction site.

SUMMARY OF THE INVENTION

There exists a need for a method and apparatus that improve efficiency relating to notifying personnel of activities associated with a network.

These and other needs are met by the present invention, where a system receives inputs from users relating to construction activities. The system then automatically generates a "ticket" to track the activity. The system also automatically selects a recipient(s) for a notification message relating to the activity and transmits the notification message to the intended recipient(s).

According to one aspect of the invention, a method for providing notification regarding an activity that may impact a telecommunications network is provided. The method includes receiving information relating to the activity and automatically transmitting a message to a party responsible for monitoring the activity.

Another aspect of the present invention provides a computer-readable medium that includes stored sequences of instructions that are executed by a processor. The instructions cause the processor to receive information relating to an activity that may impact a telecommunications network. The instructions also cause the processor to automatically transmit a message to a party responsible for monitoring the activity.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

DETAILED DESCRIPTION

Systems and methods consistent with the present invention simplify the process for transmitting a notification message associated with construction activities. A user provides construction-related information to an automatic ticket processing system. The ticket processing system generates a ticket to track the activity and transmits the ticket to a paging server. The paging server then automatically transmits a notification message to the appropriate personnel responsible for monitoring the particular area in which the construction is to occur.

System Overview

Figure 1:
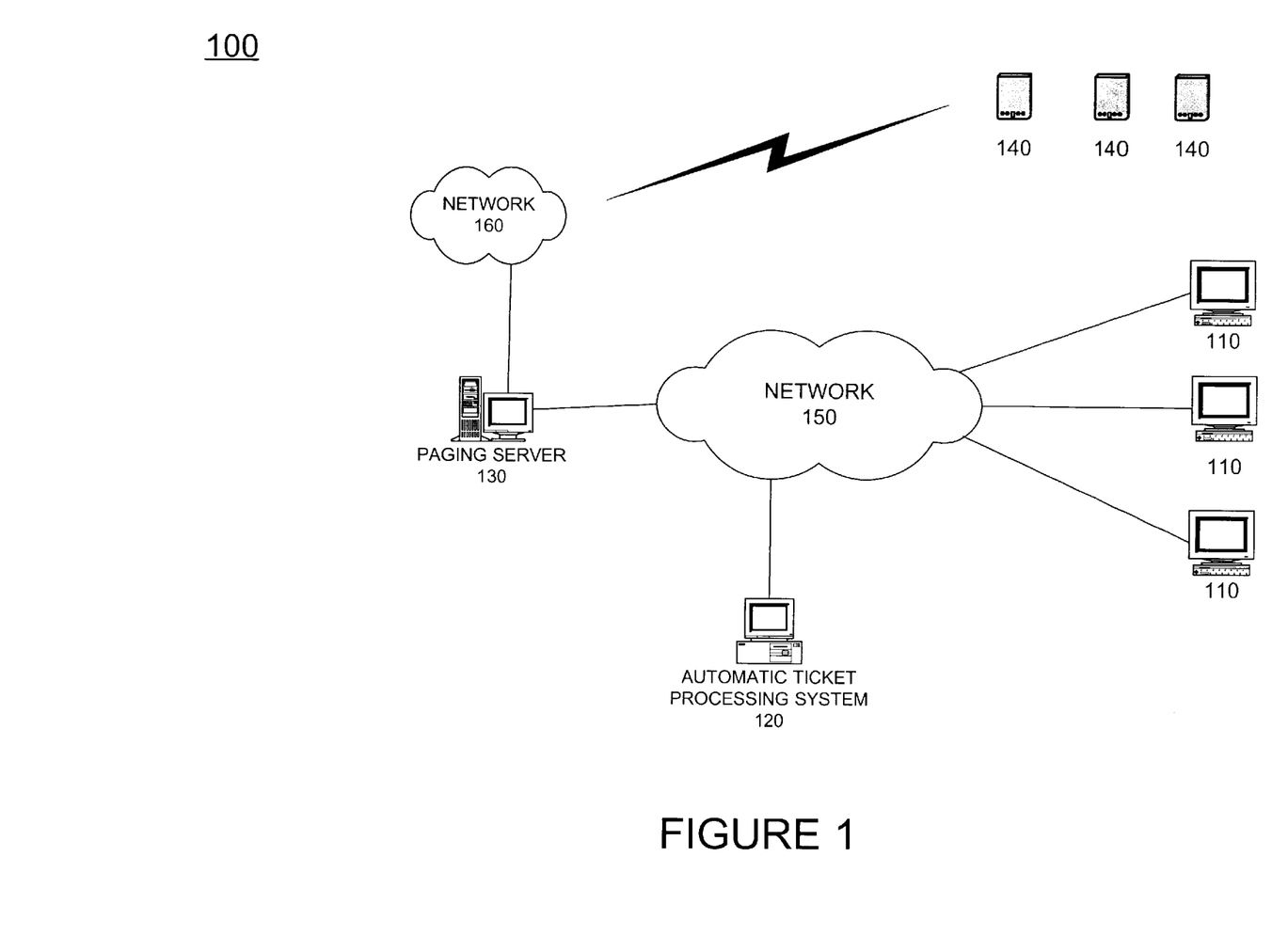
FIG. 1 is an exemplary system in which methods and systems consistent with the present invention may be implemented.

FIG. 1 is a block diagram of an exemplary system 100 in which methods and systems consistent with the present invention may be implemented. The system 100 includes a plurality of client devices 110, an automatic ticket processing system (ATP) 120, a paging server 130, a plurality of pagers 140 and networks 150 and 160.

The client devices 110 may each include any type of computer system, such as a personal computer, a laptop or a personal digital assistant (PDA), with a connection to network 150. Alternatively, client devices 110 may include "dumb" terminals connected to network 150. The client devices 110 may establish communication with ATP 120 and paging server 130 over network 150 via a wired, wireless, or optical connection. The network 150 may include the Internet, a local area network (LAN), a wide area network (WAN), an intranet or another type of network. In alternative implementations, client devices 110 may connect directly to ATP 120 and paging server 130. The client devices 110, as described in more detail below, provide inputs to ATP 120 or paging server 130 representing construction activities that may affect network operations.

The ATP 120, consistent with the present invention, may include any type of computer system, such as a mainframe, minicomputer or personal computer, which includes a connection to network 150 to enable ATP 120 to communicate with client devices 110 and paging server 130. In alternative implementations, the ATP 120 may include a mechanism for directly connecting to client devices 110 and paging server 130. The ATP 120, consistent with the present invention, provides a forum through which client devices 110 communicate construction-related information. The ATP 120 then automatically generates a "ticket" to track the activity, as described in more detail below, and transmits the ticket to the paging server 130. The ATP 120 may transmit data over network 150 via wired, wireless or optical connections.

The paging server 130 may include any type of computer system, such as a mainframe, minicomputer or personal computer, which includes a connection to network 150 to enable paging server 130 to communicate with ATP 120 and client devices 110. In alternative implementations, paging server 130 may include a mechanism for directly connecting to ATP 120 and client devices 110. The paging server 130 also includes a mechanism for communicating with network 160. The paging server 130, consistent with the present invention, provides a forum through which construction-related information is received and automatically transmitted to conventional paging devices, such as pagers 140, via network 160.

The pagers 140 may include any type of conventional paging device capable of receiving pager messages. The network 160 may include a conventional wireless network for transmitting pager messages to pagers 140. The network 160, consistent with the present invention may include a paging service provider and transmission devices, such as transmission towers linked to satellites, for transmitting the pager messages. The network 160 may also a public switched telephone network (PSTN), the Internet or another network for transmitting the pager messages to the paging service provider or to the transmission devices.

Only three client devices 110, one ATP 120 and one paging server 130 are shown for simplicity. It should be understood, however, that system 100 may include more or less client devices, paging servers and ATPs than that illustrated in FIG. 1.

Exemplary Paging Server

Figure 2:
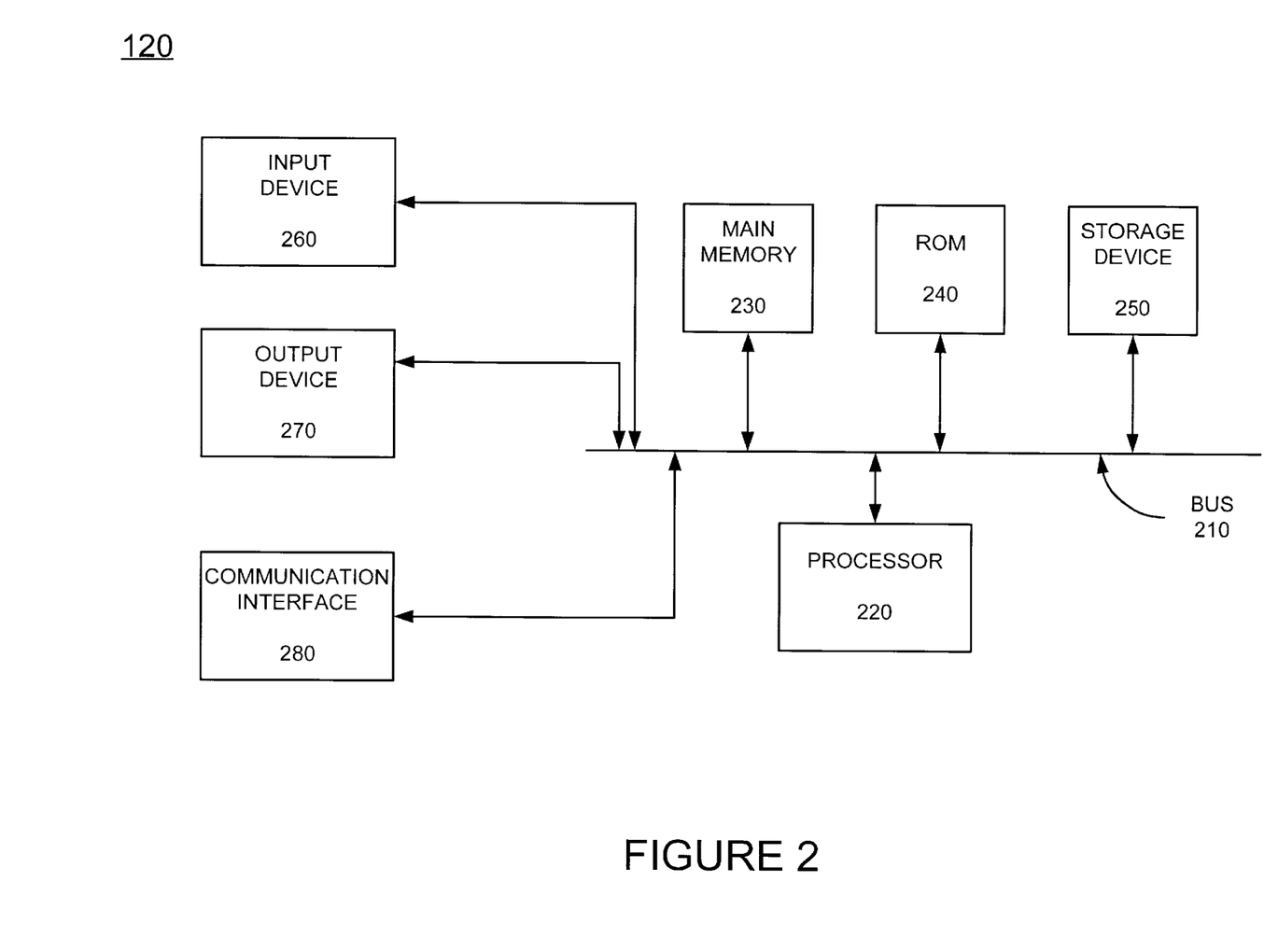
FIG. 2 is a block diagram of an exemplary automatic ticket processing system illustrated in FIG. 1, consistent with the present invention.

FIG. 2 is an exemplary diagram of ATP 120 of FIG. 1. ATP 120 includes a bus 210 or other communication medium for communicating information and a processor 220 coupled to bus 210 for processing information. ATP 120 further includes a random access memory (RAM) or other dynamic storage device 230 (referred to as main memory) coupled to bus 210 for storing information and instructions for execution by processor 220. Main memory 230 may also store temporary variables or other intermediate information during execution of instructions by processor 220. ATP 120 also includes a read only memory (ROM) and/or other static storage device 240 coupled to bus 210 for storing static information and instructions for processor 220. A data storage device 250, such as a magnetic disk or optical disk and its corresponding disk drive, can be coupled to bus 210 for storing information and instructions.

ATP 120 also includes an input device 260, an output device 270, and a communication interface 280. The input device 260 may include any conventional mechanism that permits an operator to input information to the ATP 120, such a keyboard, a mouse, a pen, voice recognition and/or biometric mechanisms, etc. The output device 270 may include any conventional mechanism that outputs information to the operator, including a display, a printer, a pair of speakers, etc. The communication interface 280 may include any transceiver-like mechanism that enables the ATP 120 to communicate with other devices and/or systems. For example, the communication interface 280 may include a modem or an Ethernet interface to a LAN. Alternatively, the communication interface 280 may include other mechanisms for communicating via a network, such as network 150.

The ATP 120, consistent with the present invention, provides a forum for client devices 110 to transmit information regarding construction-related activities. The ATP 120 also communicates with other devices, such as paging server 130. According to one embodiment, ATP 120 receives data from client devices 110, generates a "ticket" to track the activity and transmits the ticket to paging server 130 in response to processor 220 executing sequences of instructions contained in memory 230. Such instructions may be read into memory 230 from another computer-readable medium, such as a data storage device 250, or from a separate device via communication interface 280. Execution of the sequences of instructions contained in memory 230 causes processor 220 to perform the process steps that will be described hereafter. In alternative embodiments, hard-wired circuitry may be used in place of or in combination with software instructions to implement the present invention. Thus, the present invention is not limited to any specific combination of hardware circuitry and software.

Exemplary Processing for Automatic Ticketing

Figure 3:
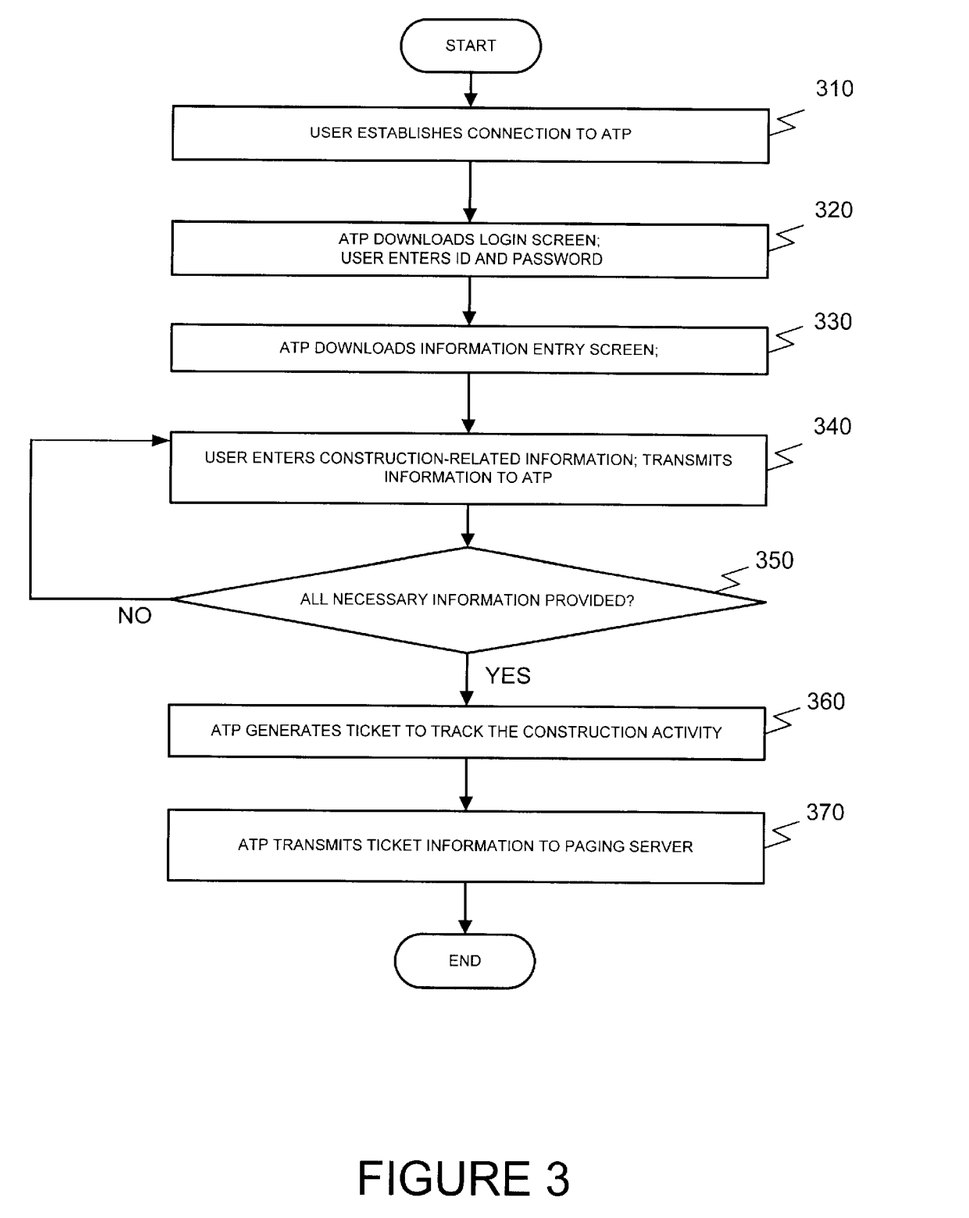
FIG. 3 is an exemplary flow diagram, consistent with the present invention, illustrating the generation of a ticket relating to construction activity.

Processing consistent with the present invention enables a user, via a client device 110, to initiate a ticketing and notification process when a construction activity is scheduled near network cables. FIG. 3 is an exemplary flow diagram, consistent with the present invention, illustrating processing associated with automatic ticketing.

Processing-begins when a user, via a client device 110, establishes a connection to the ATP 120 (step 310). The user may accomplish this via any conventional mechanism, e.g., entering a Uniform Resource Locator (URL) associated with ATP 120. When connection to the ATP 120 is established, the ATP 120 may download a login screen to client device 110 (step 320). The login screen may prompt the user to enter a user identifier (ID) and password. The user enters an ID and password and transmits the information to the ATP 120 (step 320). In alternative implementations of the invention, step 320 may be bypassed.

The ATP 120 checks the ID/password to determine whether the user is authorized to access ATP 120. Authorized users may include designated company personnel associated with maintaining and monitoring the company's network and who act as initial points of contact for receiving information on construction-related activities. Assuming that user is authorized, the ATP 120 downloads an information entry screen to client device 110 (step 330). According to one implementation consistent with the present invention, the ATP 120 may download a graphical user interface. (GUI) to client device 110 that facilitates entry of the construction-related information. For example, the GUI may include data entry boxes prompting the user to enter the street name, city and state in which the construction activity is to occur. The GUI may also include data entry boxes prompting the user to enter a cable ID, or some other ID, that identifies a cable(s) that may be affected by the construction activity.

The GUI may also include data entry boxes prompting the user to enter the scheduled start time of the construction activity and the expected duration of construction. Drop-down menus with pre-stored information may also be included in the GUI to further simplify the entry of the information.

The user enters the information and transmits the information to ATP 120 (step 340). The ATP 120 receives the information and determines whether all the necessary information has been provided (step 350). For example, if the user has not entered a time when the construction activity is scheduled to commence, the ATP 120 transmits a request to the user to provide this information and processing returns to step 340.

If the user has supplied all necessary information, the ATP generates a "ticket" to track the construction activity (step 360). This ticket is essentially an electronic mechanism used to track the progress of work associated with the construction activity. According to an exemplary implementation, the ticket includes an ID and an associated time in which the construction activity is to begin. The ID may represent the particular cable(s) or segment of cable that may be impacted by the construction activity. Alternatively, the ID may represent a particular geographic region where the activity is to occur. In implementations consistent with the present invention, the ID may be used by parties to update the status of the ticket as construction proceeds. The ticket may also include a dig start time and a field engineer ID.

The ATP 120, consistent with the present invention, stores a database listing field engineers and their respective geographic areas of responsibility. This database may be stored, for example, on storage device 250. Alternatively, the database may be stored on another computer-readable medium accessible to ATP 120. The ATP 120 correlates the location information or the cable ID information provided by the user at step 340 to a field engineer responsible for that particular area. The ATP 120 also stores detailed map files that illustrate the network cables overlaid on the streets. The ATP 120 may use such map files to correlate the location of the construction or the cable ID to a particular field engineer responsible for that area.

In each of these scenarios, the ATP 120 automatically determines the responsible field engineer using pre-stored data. This advantageously saves time associated with manually looking up a listing of field engineers and determining the responsible party. After generating the ticket, the ATP 120 transmits the ticket to the paging server 130 (step 370).

Exemplary Paging Server

Figure 4:
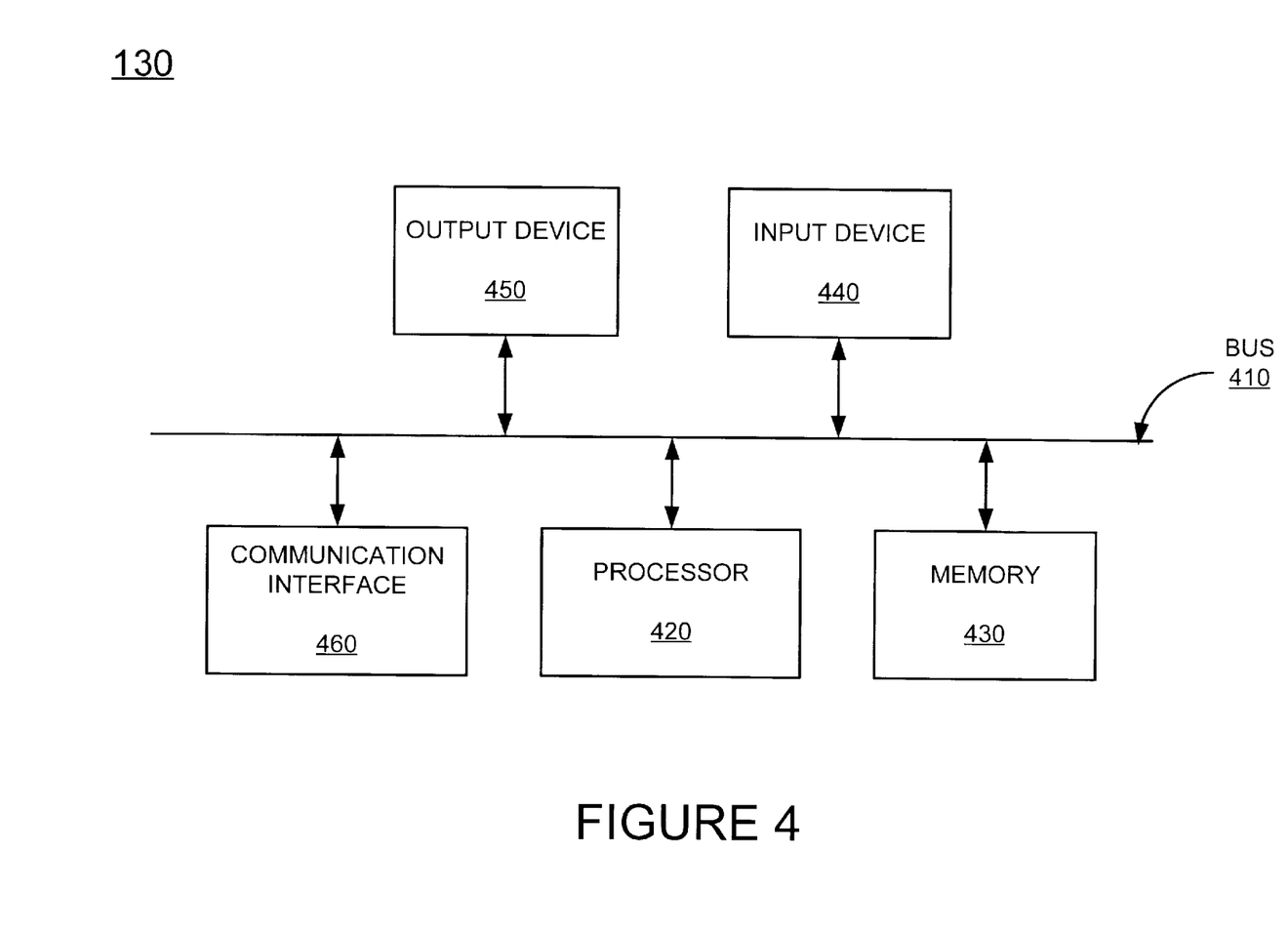
FIG. 4 is a block diagram of an exemplary paging server illustrated in FIG. 1, consistent with the present invention.

Paging server 130 receives information from ATP 120, generates pager messages and transmits these pager messages, as described in more detail below. FIG. 4 is an exemplary diagram of the paging server 130 consistent with the present invention.

The paging server 130 includes a bus 410, a processor 420, a memory 430, an input device 440, an output device 450, and a communication interface 460. The bus 410 permits communication among the components of the paging server 130.

The processor 420 may include any type of conventional processor or microprocessor that interprets and executes instructions. The memory 430 may include a RAM or another dynamic storage device that stores information and instructions for execution by the processor 420; a ROM or another type of static storage device that stores static information and instructions for use by the processor 420; and/or some other type of magnetic or optical recording medium and its corresponding drive.

The input device 440 may include any conventional mechanism that permits an operator to input information to the paging server 130, such as a keyboard, a mouse, a pen, voice recognition and/or biometric mechanisms, etc. The output device 450 may include any conventional mechanism that outputs information to the operator, including a display, a printer, a pair of speakers, etc.

The communication interface 460 may include any transceiver-like mechanism that enables the paging server 130 to communicate with other devices and/or systems. For example, the communication interface 460 may include mechanisms for communicating via a network, such as network 150 and network 160 (FIG. 1). In one implementation consistent with the present invention, communication interface 460 may include a number of modems for transmitting the pager messages via network 160. In alternative implementations, the modems may be external to paging server 130. In this scenario, the communication interface 460 enables the paging server 130 to communicate with the paging modems. The particular number of modems may be based on the expected number of pager messages to be transmitted in system 100. As the number of messages being transmitted increases, more modems may be added to enable multiple messages to be transmitted via network 160 at essentially the same time.

Execution of the sequences of instructions contained in memory 430 causes processor 420 to perform the process steps that will be described hereafter. In alternative embodiments, hard-wired circuitry may be used in place of or in combination with software instructions to implement the present invention. Thus, the present invention is not limited to any specific combination of hardware circuitry and software.

Exemplary Processing for Automatic Paging

Figure 5:
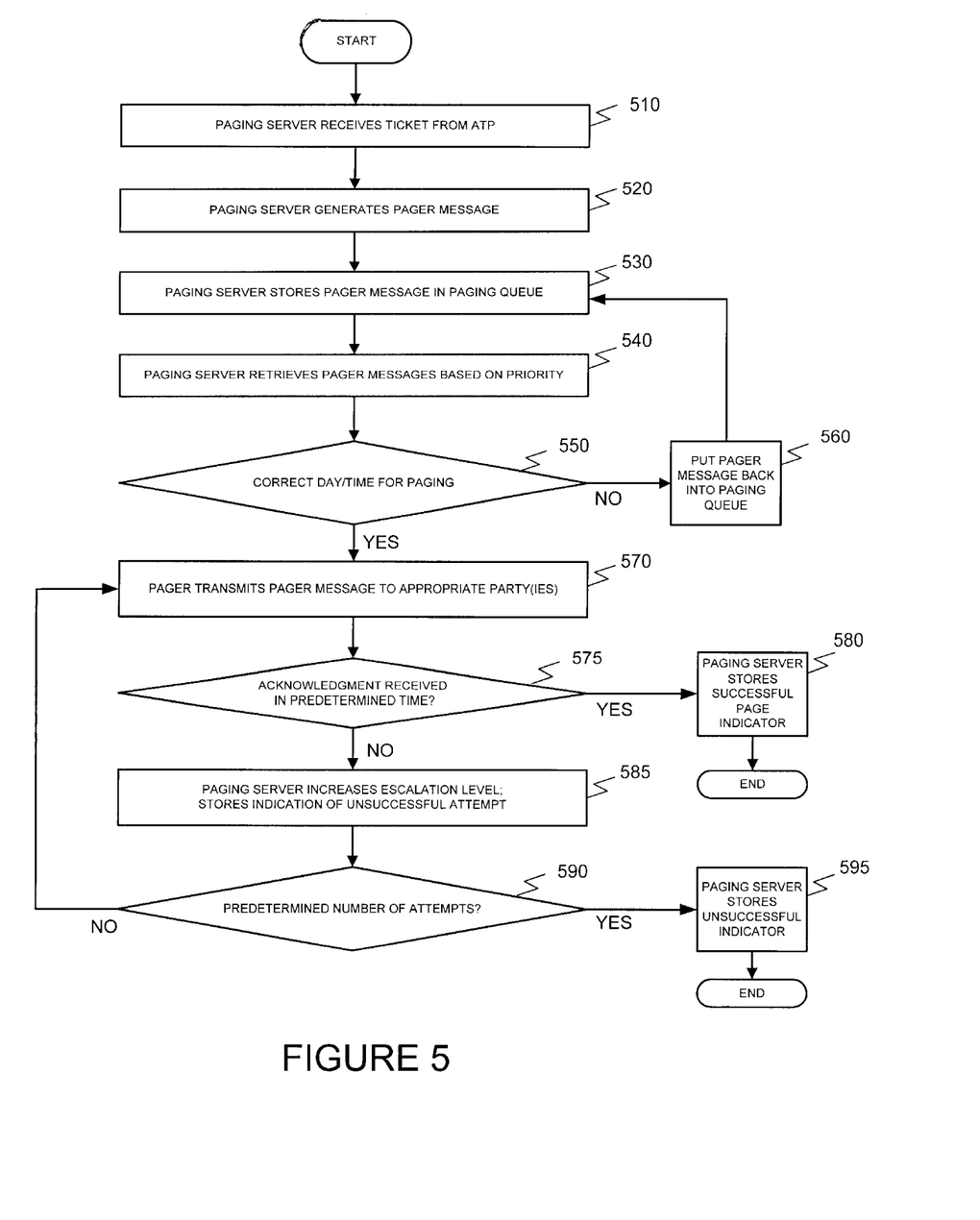
FIG. 5 is an exemplary flow diagram, consistent with the present invention, illustrating processing associated with automatic paging.

Processing consistent with the present invention enables paging server 130 to automatically generate and transmit pager messages to notify the appropriate personnel of construction-related activity. FIG. 5 is an exemplary flow diagram, consistent with the present invention, illustrating processing associated with automatic paging.

Processing begins when paging server 130 receives the ticket information from ATP 120 (step 510). In alternative implementations, the paging server 130 may receive construction-related information directly from a user via client device 110. In this scenario, the paging server 130 may generate the ticket in a similar procedure as discussed with relation to FIG. 3. In either case, after paging server 130 receives or generates the ticket, the paging server 130 initiates a process for generating a pager message (step 520).

According to an exemplary implementation, the paging server 130 uses the information contained in the ticket to generate a standardized text message. For example, the text of the message may contain an identifying code representing Emergency and Urgent tickets. The paging server 130, consistent with the present invention, may categorize the tickets as "Emergency," "Urgent" or "Normal" based on the time that the construction activity is to commence. For example, if the paging server 130 receives a ticket for which a dig is scheduled to begin in two hours, the paging server 130 may identify the ticket as Emergency. The particular criteria associated with Emergency, Urgent and Normal tickets may be set based on the particular user's requirements. It should be noted that other categories may be also provided based on the particular user's requirements.

The paging server 130 may, for example, use a code of "XXXX" for an Emergency ticket and a code of "YYYY" for an Urgent ticket. Any particular codes may be used based on the particular user's requirements. In any event, the codes used will be recognized by the recipients as the Emergency or Urgent code. The pager message may also include a client device ID identifying the client device 110 responsible for initiating the ticket. The recipients will similarly recognize these codes as being associated with particular ones of the client devices 110. This information may later be used when responding to the pager message, as described in more detail below. In alternative implementations, the client device ID may be a telephone number associated with a party operating the particular client device 110.

The paging server 130 may also include a cable ID in the pager message. This information, when included with the information provided in the ticket, will be recognized by the recipient as a particular cable in the company's network that may be affected by the construction activity. Any other particular information may be pulled from the construction ticket to generate the pager message. The paging server 130, in implementations consistent with the present invention, may also access other databases of information to include information in the pager message, based on the received ticket information and the user's requirements. The details regarding the steps required to retrieve the stored information and auto-populate various fields in a pager messages are not described in order not to unduly obscure the thrust of the present invention. However, one of ordinary skill in the art would be able to program paging server 130 to retrieve and include such information in various fields in a pager message, based on the functions described herein and the particular user's requirements.

After categorizing the ticket and generating the pager message, the paging server 130 accesses a database storing the pager numbers of various field engineers responsible for monitoring the company's network. These pager numbers may be correlated to the field engineer' IDs or correlated to a particular geographical area for which the field engineer is responsible. The database may also include personal identification numbers (PINs) for the respective field engineers. This database may be stored, for example, in memory 430 (FIG. 4). Alternatively, the database may be stored on any other computer-readable medium accessible to paging server 130. The paging server 130 identifies the particular field engineer responsible for the area in which the construction activity is to occur. The paging server then stores the pager message with the pager number in a paging queue (step 530).

The paging server 130, consistent with the present invention, stores pager messages in the paging queue based on the priority associated with each particular message, along with the appropriate pager number. The paging server 130, consistent with the present invention, polls the paging queue at predetermined intervals and retrieves the pager messages, based on their priority (step 540). That is, the paging server 130 retrieves pager messages marked as Emergency first, followed by Urgent and followed by Normal. The paging server 130 also tracks all messages in the queue to ensure that all pager messages are sent well before commencement of the construction activity.

According to an exemplary implementation, the paging server 130 may retrieve batches of pager messages at each polling interval, thereby saving time associated with processing these messages. The paging server 130 then sets a corresponding paging disposition code to "in-process" (IP) for each of the retrieved messages and stores these IP pager messages as files in a processing folder. The paging server 130 then initiates the paging process for these files (step 540).

Before transmitting a pager message, however, the paging server 130 determines whether the current day and time are appropriate for paging (step 550). More specifically, the paging server 130 determines the time zone associated with where the construction activity is to occur, based on the location information provided in the ticket. The paging server 130 then determines whether the current time is within a range of predetermined times valid for transmitting pager messages to personnel, such as field engineers. For example, the predetermined range of valid times for transmitting pages on Monday through Friday may be 7:00 AM to 10:00 PM and the predetermined range for Saturday and Sunday may be 9:00 AM to 4:00 PM. In this case, the paging server 130 determines the whether the current time, in the appropriate time zone, is within these ranges for the particular day of the week. The particular schedule for valid paging times may be based on the particular user's requirements and coordinated with the field engineers' schedules. Additionally, any number of scheduling options may be used. For example, for Emergency pages, all times may be valid for transmitting pages.

If the paging server 130 determines that the day or time are not valid, the paging server 130 returns the pager message to the paging queue (step 560). Assuming that the day/time are valid for paging, the paging server 130 transmits the pager message in a conventional manner, such as via network 160, to the appropriate recipient's pager 140 (step 570). It should be noted that the pager message may be transmitted to multiple recipients in implementations consistent with the present invention.

The paging server 130, consistent with the present invention, stores an indication each time a page attempt is made. For example, the paging server 130 may store information in a comment field associated with the pager message detailing the field engineer paged, the pager number, the date/time of page, and that the page was an "AUTO" page.

The paging server 130 then determines whether the field engineer received the page and has acknowledged the page in a predetermined period of time (step 575). In implementations consistent with the present invention, the field engineer may, for example, respond to the client device 110 that initiated the ticket via a conventional means, such as by electronic mail (email) to the client device 110 or by telephone to the party that initiated the ticket. In further implementations, the field engineer may respond directly to paging server 130 via conventional means, such as by email or by telephone to the party responsible for updating the status of pages.

In any event, once the field engineer receives the page and acknowledges receipt of the message to the party designated to receive the acknowledgement, that designated party transmits an acknowledgement to paging server 130 that the page was received. The paging server 130 then stores the pager message in a directory on the paging server 130 (step 580). The paging server 130 may also set a disposition code associated with the pager message to "SU" (successful paging).

If the field engineer does not respond to the page in a predetermined period of time, the paging server 130, consistent with present invention, may retransmit the page. The paging server 130 may also increase an escalation level associated with the retransmitted pager (step 585). For example, the paging server 130 may include a code in the pager message that the new page is the second attempt. The paging server 130 may also automatically store this information associated with the pager message in a memory, such as memory 430. The stored information may, for example, indicate: "First Page to <userid> at 1-800-XXX-XXXX at 08:31 on 01 Jul 1999, Not Acknowledged."

Next, the paging server 130 determines whether a predetermined number of paging attempts have been made (step 590). If the predetermined attempts have not been made, processing returns to step 570 where the paging server 130 transmits the pager message, with the escalation code. If acknowledgment is not received from the appropriate field engineer (step 575), the paging server 130 may further increase the escalation level to page the field engineer's manager or some other supervisory personnel. For example, the paging server 130 may access the database storing the pager numbers and retrieve the pager number for the particular field engineer's manager. The paging server 130 may send subsequent pages to the field engineer's manager, and the field engineer, with similar indications regarding the particular attempt, e.g., manager, 1st attempt; manager, 2nd attempt and so on.

If the paging server 130 does not receive an acknowledgement after a predetermined number of attempts to page either one of or both the field engineer and a supervisory party, the paging server 130 stores an unsuccessful indicator in the paging server 130 (step 595). The paging server 130 then stores the pager message in a directory on the paging server 130. For these messages, the paging disposition code may be set to "US" (unsuccessful paging attempt) and may be recycled into the paging queue. A manual override may also be set to specify the date and time when the unsuccessful page is to be re-sent.

Alternatively, if the paging attempt was unsuccessful, the paging server 130 may provide an indication to, for example, output device 450 (FIG. 4) that the page was unsuccessful and that the page should be re-designated for manual escalation, i.e., manual paging.

In the manner described above, the paging server 130 is able to transmit pager messages and provide indications of successful and unsuccessful paging. Such information may advantageously be used for audit purposes at a later time.

The present invention has been described as transmitting pager messages via network 160 to various pagers 140. Field engineers frequently, however, have different paging services provided by different paging service providers. In essence, uniformity of paging service across the team of field engineers typically does not exist. For example, some paging service providers provide access to a paging terminal, i.e., a modem, allowing a computer to initiate paging via this modem, while others just provide a mechanism that allows only touch tone messages. The present invention, however, may be used to transmit pager messages to pagers using any paging service provider.

For example, for providers that utilize touch tone message facilities, an access string may be stored along with each provider in a database accessible to paging server 130, such as a paging service provider table stored in memory 430. In such an instance, a "Type" field in the paging service provider table may be set to "DIRECT" to indicate that a direct pager phone number has to be dialed in order to get the greeting message. Similarly, the access string may dictate how much delay to provide when navigating the menu options in the voice message, before sending out the final message.

When a paging service provider uses a paging terminal, i.e., modem, the "Type" field in the paging service provider table may be set to "MODEM," indicating that the paging server 130 can connect to this modem and send out the page directly using the pager number of the field engineer.

In either of these situations, the particular paging service information may be retrieved by the paging server 130 from the paging service provider table before sending the pager message.

Systems and methods consistent with the present invention provide notification of construction-related activity to field personnel. An advantage of the invention is that a user can submit construction-related information to a client device and the information is automatically processed and transmitted to the appropriate field personnel, thereby saving time associated with manually calling or paging individuals. Another advantage of the present invention is that a priority code is automatically included with the message to further provide valuable information to the field personnel. An additional advantage of the invention is that the system can be used with pagers that utilize different paging service providers, thereby eliminating the need for multiple paging servers.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, the present invention has been described with the example of an ATP 120 receiving construction-related information and sending a ticket to paging server 130. In alternative implementations consistent with the present invention, the functions of ATP 120 and paging server 130 may be performed by a single server, such as paging server 130.

Additionally, the present invention has been described as generating pager messages to be sent to the appropriate field personnel. In alternative implementations, the paging server 130, or another server, may transmit any combination of pager messages, facsimile messages and email messages to various personnel. In still further implementations consistent with the present invention, the paging server 130 may transmit messages to a field engineer's cellular telephone or personal digital assistant (PDA) using a conventional short message service (SMS).

What is claimed is:

1. A method for providing notification regarding an activity that may impact a telecommunications network, comprising:
   receiving information relating to the activity; and
   automatically transmitting a message to a party responsible for monitoring the activity,
   wherein the activity represents construction-related activity and the information includes a start time and at least one of a location and a cable identifier associated with the construction-related activity.

2. The method of claim 1, further comprising:
   determining whether the message was received.

3. The method of claim 2, further comprising:
   automatically retransmitting the message when the message was not received.

4. The method of claim 1, further comprising:
   generating a pager message using the received information, the pager message including a priority indicator;

automatically accessing a database to determine a pager number associated with the party responsible for monitoring the construction-related activity; and transmitting the pager message with the priority indicator.

5. The method of claim 1, further comprising:

storing the received information in a queue;

assigning a priority to the received information based on a time in which the activity is to occur;

retrieving the stored information based on the priority; and transmitting at least a portion of the stored information with a priority indicator and an identifier for acknowledging receipt of the message.

6. The method of claim 1, wherein the automatically transmitting includes:

sending a pager message that identifies a priority and a cable associated with the activity.

7. The method of claim 1, wherein the automatically transmitting includes:

transmitting the message to at least one recipient via at least one of a paging system, a cellular system, a facsimile system and an electronic mail system.

8. A system for providing notification regarding an activity that may impact a telecommunications network, comprising:

a memory configured to receive and store information relating to the activity; and a processor configured to:

generate a message using the received information, and automatically transmit the message to a party responsible for monitoring the activity, wherein the activity represents construction activity and the information includes a start time and at least one of a location and a cable identifier associated with the construction activity.

9. The system of claim 8, wherein the processor is further configured to:

determine whether the message was received, and automatically retransmit the message when the message was not received.

10. The system of claim 8, the processor being further configured to:

generate a pager message using the received information, the pager message including a priority indicator, automatically access a database to determine a pager number associated with the party responsible for monitoring the construction activity, and transmit the pager message with the priority indicator.

11. The system of claim 8, wherein the memory is further configured to:

store pager numbers associated with parties responsible for monitoring construction activity associated with the telecommunications network, and wherein the processor is further configured to:

assign a priority to the received information based on a time in which the activity is to occur, access the memory to determine a pager number associated with a party responsible for monitoring the construction activity, and transmit at least a portion of the stored information with a priority indicator and an identifier for acknowledging receipt of the message.

12. The system of claim 8, wherein when automatically transmitting, the processor is configured to:

send a pager message that identifies a priority and a cable associated with the activity.

13. The system of claim 8, wherein when automatically transmitting, the processor is configured to:

transmit the message to at least one recipient via at least one of a paging system, a cellular system, a facsimile system and an electronic mail system.

14. The system of claim 8, further comprising:

at least one modem for transmitting the message via a network to a paging system.

15. A computer-readable medium having stored thereon a plurality of sequences of instructions, said sequences of instructions including sequences of instructions which, when executed by a processor, cause said processor to perform the steps of:

receiving information relating to an activity that may impact a telecommunications network; and automatically transmitting a message to a party responsible for monitoring the activity, wherein the activity represents construction activity and the information includes a start time and at least one of a location and a cable identifier associated with the construction activity.

16. The computer-readable medium of claim 15 causing said processor to perform the further steps of:

determining whether the message was received; and automatically retransmitting the message when the message was not received.

17. The computer-readable medium of claim 15, further causing the processor to perform the steps of:

generating a pager message using the received information, the pager message including a priority indicator;

automatically accessing a database to determine a pager number associated with the party responsible for monitoring the construction activity; and transmitting the pager message with the priority indicator.

18. The computer-readable medium of claim 15 causing said processor to perform the further steps of:

storing the received information in a queue;

assigning a priority to the received information based on a time in which the activity is to occur;

retrieving the stored information based on the priority; and transmitting at least a portion of the stored information with a priority indicator and an identifier for acknowledging receipt of the message.

19. The computer-readable medium of claim 15, wherein the automatically transmitting includes sending a pager message that identifies a priority and a cable associated with the activity.

20. The computer-readable medium of claim 15, wherein the automatically transmitting includes transmitting the message to at least one recipient via at least one of a paging system, a cellular system, a facsimile system and an electronic mail system.

21. A method for providing notification of construction activity that may impact a telecommunications network, comprising:

receiving information relating to the construction activity;

generating an electronic ticket to track the construction activity; and automatically transmitting a message to a party responsible for monitoring the construction activity, wherein the received information includes a start time and at least one of a location and a cable identifier associated with the construction activity.

22. The method of claim 21, further comprising:

determining whether the message was received;

automatically retransmitting the message when the message was not received; and storing information relating to whether the message was received.

23. The method of claim 21, further comprising:

generating a pager message from the received information, the pager message including a priority indicator;

automatically accessing a database to determine a pager number associated with the party responsible for monitoring the construction activity; and transmitting the pager message with the priority indicator.

24. The method of claim 21, wherein the automatically transmitting includes:

transmitting the message to at least one recipient via at least one of a paging system, a cellular system, a facsimile system and an electronic mail system.

25. The method of claim 21, wherein the automatically transmitting includes:

transmitting the message to multiple pagers, at least two of the pagers utilizing different paging service providers.

* * * * *